(12) United States Patent
Ekstam

(10) Patent No.: US 7,025,048 B2
(45) Date of Patent: Apr. 11, 2006

(54) FUEL/AIR SEPARATION SYSTEM

(76) Inventor: Charles Bradley Ekstam, 905 Camelot Acres Dr., Villa Ridge, MO (US) 63089

( * ) Notice: Subject to any disclaimer, the term of this patent is extended or adjusted under 35 U.S.C. 154(b) by 0 days.

(21) Appl. No.: 11/124,320

(22) Filed: May 6, 2005

(65) Prior Publication Data

US 2005/0199222 A1    Sep. 15, 2005

Related U.S. Application Data

(63) Continuation of application No. 10/783,055, filed on Feb. 20, 2004, now Pat. No. 6,892,710.

(60) Provisional application No. 60/449,518, filed on Feb. 21, 2003.

(51) Int. Cl.
*F02M 37/04*        (2006.01)

(52) U.S. Cl. ............... 123/516; 123/518; 123/519

(58) Field of Classification Search ........... 123/510, 123/516, 518, 519, 520
See application file for complete search history.

(56) References Cited

U.S. PATENT DOCUMENTS

| | | | |
|---|---|---|---|
| 1,269,787 A | 6/1918 | Church | |
| 2,222,274 A | 11/1940 | Antonsen | |
| 3,488,926 A | 1/1970 | Gilman | |
| 3,631,654 A | 1/1972 | Riely | |
| 3,775,947 A | 12/1973 | Dupont et al. | |
| 3,969,092 A | 7/1976 | Huffman et al. | |
| 4,017,397 A | 4/1977 | Copeland | |
| 4,041,569 A | 8/1977 | Petersen | |
| 4,093,428 A | 6/1978 | Swogger | |
| 4,179,372 A | 12/1979 | Rosaen | |
| 4,330,306 A | 5/1982 | Salant | |
| 4,372,847 A | 2/1983 | Lewis | |
| 4,411,239 A | 10/1983 | Kelch | |
| 4,424,128 A | 1/1984 | Shinaver | |
| 4,454,848 A * | 6/1984 | Duprez ............... | 123/516 |
| 4,484,936 A | 11/1984 | Sakai | |
| 4,487,618 A | 12/1984 | Mann | |
| 4,502,954 A | 3/1985 | Druffel | |
| 4,512,882 A | 4/1985 | Fischer et al. | |
| 4,512,884 A | 4/1985 | Wheatley | |
| 4,529,512 A | 7/1985 | Williamson et al. | |
| 4,539,965 A | 9/1985 | Soltau | |
| 4,543,938 A | 10/1985 | Szlaga | |
| 4,615,694 A | 10/1986 | Raines | |
| 4,683,055 A | 7/1987 | Bosch et al. | |
| 4,732,671 A | 3/1988 | Thornton et al. | |
| 4,746,430 A | 5/1988 | Cooley | |
| 4,763,684 A | 8/1988 | Kelch | |
| 4,828,587 A | 5/1989 | Baurmeister et al. | |
| 4,933,093 A | 6/1990 | Keller | |
| 4,976,754 A | 12/1990 | Edelstein et al. | |
| 4,979,482 A | 12/1990 | Bartlett | |
| 4,997,555 A | 3/1991 | Church et al. | |

(Continued)

OTHER PUBLICATIONS

Cummins Service Topics, "Throwaway Fuel Filter Opertaing Fuel Levels" dated Jul. 1, 1965.

*Primary Examiner*—Thomas Moulis
(74) *Attorney, Agent, or Firm*—Chase Law Firm, L.C.

(57) ABSTRACT

A fuel/air separation apparatus for separating air and/or vapor from a liquid fuel. The apparatus includes a canister and filter element which separates the entrained air and/or vapor from the fuel and provides substantially air/vapor-free fuel for use by an engine and returns the filtered air/vapor and any excess fuel to the vehicle's fuel tank.

23 Claims, 2 Drawing Sheets

U.S. PATENT DOCUMENTS

| | | |
|---|---|---|
| 5,095,880 A | 3/1992 | Ricks |
| 5,207,898 A | 5/1993 | Hodgkins |
| 5,264,121 A | 11/1993 | Guzman-Sanchez |
| 5,300,223 A * | 4/1994 | Wright ........................ 210/232 |
| 5,355,860 A | 10/1994 | Ekstam |
| 5,746,184 A | 5/1998 | Ekstam |
| 6,729,310 B1 | 5/2004 | Ekstam |
| 2002/0170545 A1 | 11/2002 | Ekstam |
| 2004/0011338 A1 | 1/2004 | Ekstam |

* cited by examiner

FUEL/AIR SEPARATION SYSTEM

CROSS-REFERENCE TO RELATED APPLICATION

This application claims the benefit of a prior filed, co-pending applications Ser. No. 60/449,518, filed Feb. 21, 2003, and is a continuation of Ser. No. 10/783,055, filed Feb. 20, 2004, now U.S. Pat. No. 6,892,710 both entitled FUEL/AIR SEPARATION SYSTEM.

BACKGROUND OF THE INVENTION

This invention relates to an apparatus for removing entrained gas from a liquid and, more particularly, to a fuel/air separation apparatus to remove entrained particle contaminants, air and vapor from a liquid.

Today's internal combustion engines typically utilize a fuel injection type system to inject fuel into the engine cylinder. The fuel is delivered to the cylinder in precise quantity of air. The ratio of air/fuel mixture is tightly controlled in order to maintain a smooth and efficient running engine. If air or other gaseous vapor is entrained with the fuel and injected into the cylinder, the air/fuel ratio may be affected resulting in a rough running engine and loss of power and efficiency. Air and/or vapor in a fuel injector delays injection of fuel into the cylinder retarding the engine timing. Additionally, additional air or vapor may lower the cylinder air pressure resulting in the cylinder rings not tightly seating against the cylinder wall and allowing blow-by and increasing vehicle exhaust emissions.

U.S. Pat. No. 5,355,860 discloses a three-filter system for removing entrained undesired gas from diesel fuel. There are many deficiencies with the system described and claimed in the '860 patent One deficiency is the entrained gas is only removed on the inlet side of the filter element which results in dirty fuel and air being returned to the fuel tank. Another deficiency is the system requires that the filter element is completely submerged below the surface of the fuel, If air comes into contact with the filter element it will pass through the filter element, through the outlet to the engine. A third deficiency is a vacuum is created on the inside of the filter element because the filter element presents a barrier to the passage of fuel, and the overflow tube is a free unobstructed opening to the fuel tank. This vacuum causes air and vapor bubbles to form on the inside of the filter element, which are then carried through the outlet to the engine.

U.S. Pat. No. 5,746,184 discloses a system for removing undesired gas from diesel fuel and has been sold commercially under the trade names Fuel Preporator® model Nos. FP-1200, FP-135 and FP-133A, and the AirDog Fuel Preporator® model No. FP-80, available from Ekstam Worldwide. The '184 patent is a continuation-in-part of the '860 patent and adds a new and previously unclaimed second embodiment to the single embodiment disclosed and claimed in the '860 patent. The second embodiment set forth and claimed in the '184 patent also suffers from many deficiencies. Like the system disclosed and claimed in the '860 patent, the '184 includes an opening to the return line on the inlet side of the filter element causing dirty fuel and air to be returned to the fuel tank. The '184 system also includes an opening on the inside of the filter element connected to the return line. However, the pressure on the inlet side of the filter element must rise to a level to force the air across the filter element to the interior. In practice the pressure normally will not reach this level and dirty fuel and air will be returned to the fuel tank through the inlet side fuel return line, If the pressure rises to the necessary level to force the air through the filter element due to an obstructed inlet side fuel return line opening, for example, a vacuum may be created on the inside of the filter element creating gas bubbles at the outlet tube opening and drawing bubbles into the outlet.

SUMMARY OF THE INVENTION

A fuel/air separation apparatus is provided which separates entrained air/vapor from fuel. The apparatus includes a canister and filter element which separates the fuel from entrained air/vapor bubbles and provide separate paths for substantially air/vapor-free fuel to go to the vehicle's engine and the air/vapor and any excess fuel to return to the vehicle's fuel tank.

DETAILED DESCRIPTION

Figure 1:
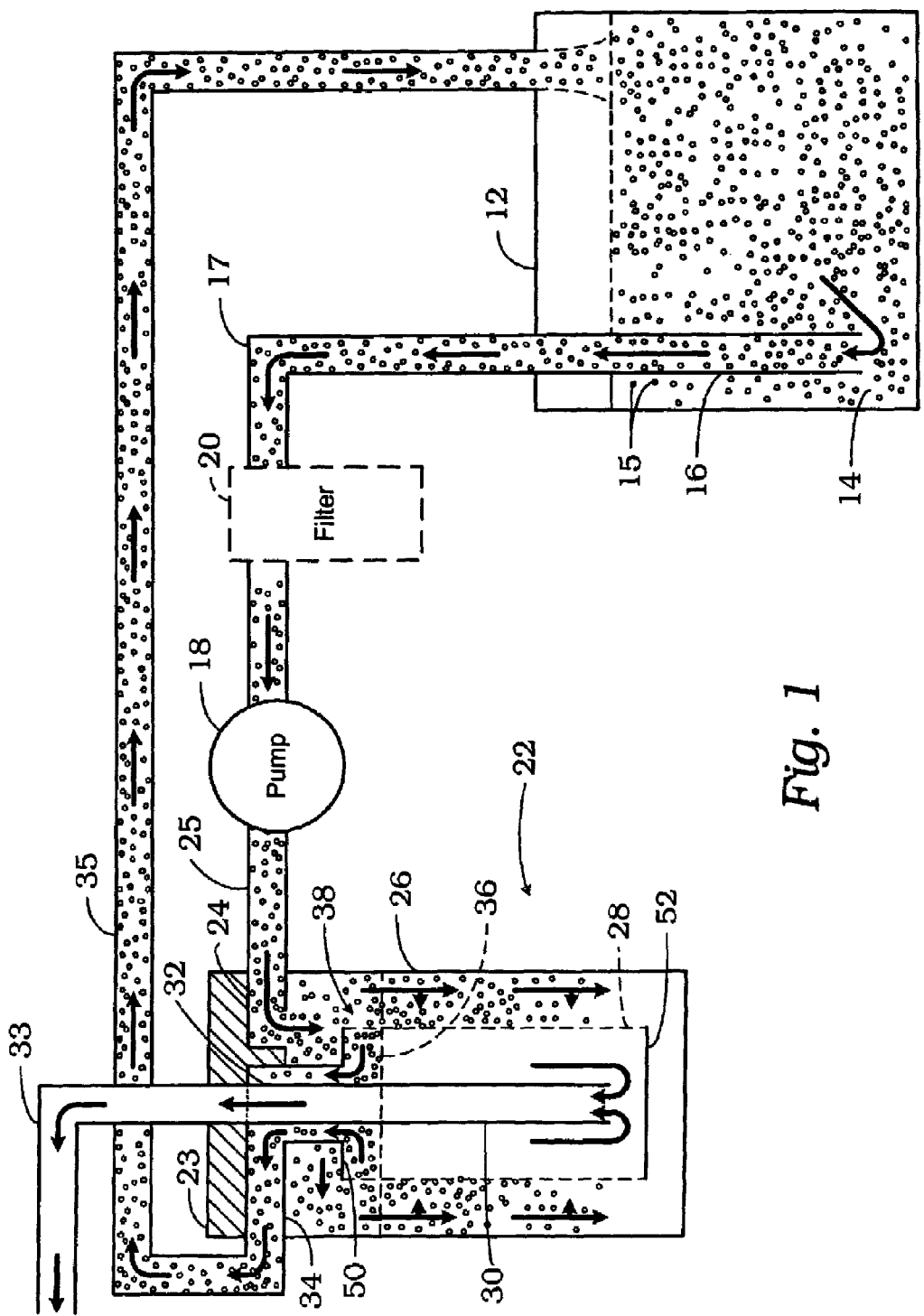
FIG. 1 is a diagrammatic sectional view of a fuel system utilizing a fuel/air separation apparatus of the present invention

Referring to FIG. 1, an illustration of a fuel system for use in a vehicle (not shown) is generally indicated by reference numeral 10. The fuel system 10 includes a fuel tank 12 for storing fuel 14, and a fuel intake 16 to draw fuel 14 from tank 12 under a vacuum from pump 18. The input of pump 18 is connected to an optional fuel filter or water separator 20 to separate out particle contaminants such as dirt and rust particles and/or water from the fuel 14. The output of pump 18 is connected to fuel/air separation apparatus 22.

Fuel/air separation apparatus 22 includes an inlet port 24, a hallow canister 26, a filter element 28, a draw tube 30, a fuel port 32 and an air/vapor/fuel return port 34.

Fuel 14 in tank 12 includes air and vapor bubbles 15 mixed with the fuel 14. As the fuel 14 is drawn into the fuel intake tube 16, the entrained air/vapor bubbles 15 are carried along with the fuel 14 into the fuel line 17. Fuel 14 in line 17 may also include other debris such as dirt and rust particles and water (not shown).

Figure 2:
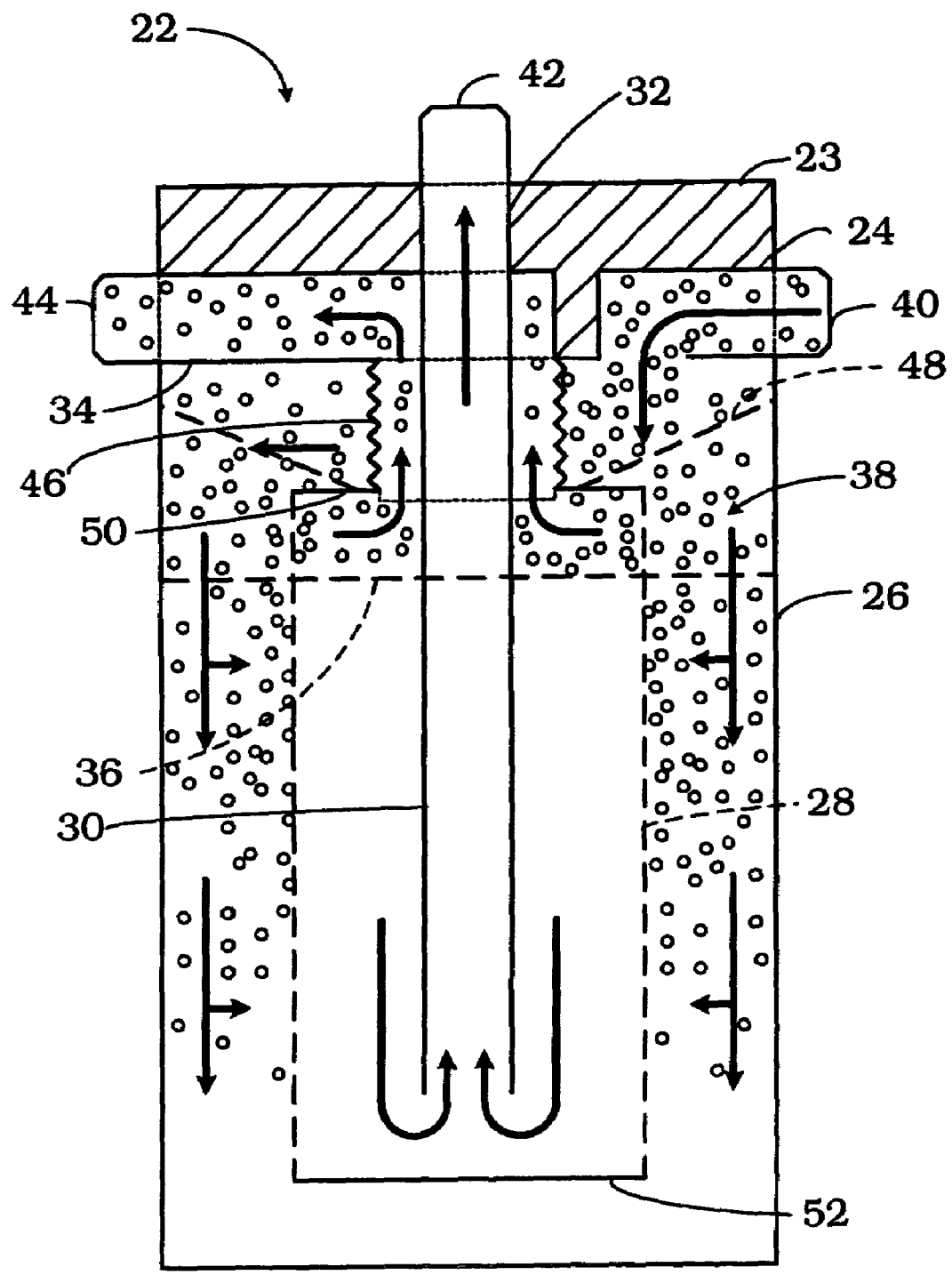
FIG. 2 is an enlarged sectional view of the fuel/air separation apparatus of FIG. 1.

Referring to FIGS. 1 and 2, the fuel 14 and entrained air/vapor bubbles 15 travel through pump 18 and filter/water separator 20. The fuel 14 with entrained air/vapor bubbles 15 enters fuel/air separation apparatus 22 through inlet port 24 under pressure from pump 18. The fuel 14 and entrained air/vapor bubbles 15 are directed into canister 26 at the outer diameter of filter 28. Filter 28 is a conventional pleated paper fuel filter, for example.

At this point, the filter 28 allows the fuel 14 to pass while at the same time providing resistance to the air/vapor 15 passage through the filter media. As the fuel passes through filter 28, it enters draw tube 30 and continues onto the outlet port 32 to the vehicle's engine (not shown) with substantially no entrained air/vapor. If the fuel demand of the engine is less than the fuel provided by pump 18, the excess fuel returns to the tank 12 through the return port 34 and return line 35. Air/vapor bubbles 15 rise to the highest point in canister 26 and collect.

When an equilibrium point is reached where the pressure differential across the filter 28 is equal to the wetted paper resistance to air/vapor passage, air or vapor collected at the top of canister 26, shown as the area above broken line 36, passes through the top portion of filter 28, generally indicated by reference number 38. The air/vapor that has passed through filter 28 is immediately passed through return port 34 along with any excess fuel and returns to tank 12. In this manner, any dirt or rust particles are removed by filter 28 before the fuel and/or air/vapor are returned to the tank 12.

Fuel/air separation apparatus 22 includes a base 23 which is machined from aluminum stock or other suitable material. The base 23 has an inlet port 24, an outlet port 32 and a return port 34. A threaded inlet fitting 40 is threadably inserted into inlet portion 24 in base 23. Inlet fitting 40 provides a coupling to inlet line 25. A threaded outlet fitting 42 is threadably inserted into outlet port 32 and provides a coupling to outlet line 33. A threaded return fitting 44 is threadably inserted into return port 34 and provides a coupling to return line 35.

Draw tube 30 has a threaded upper portion that is inserted into the outlet port 32 opposite the outlet fitting 42. Draw tube 30 passes through a threaded filter media receiver 46 which is in communication with return port 34. The threaded media receiver 46 is sized to allow free-flow of fuel 14 and air/vapor 15 that has passed through filter element 28 around the upper portion of draw tube 30 to return port 34.

Canister 26 includes a filter element 28 which is generally centered within canister 26 and secured with support structure 48. Support structure 48 is perforated or has spaced-apart ribs to allow free flow of fuel 14 around filter element 28. Filter element 28 may be a common prior art cylindrical filter element which includes upper 50 and lower 52 retaining plates to provide structure and shape to the filter media of filter 28. The upper retaining plate 50 includes a threaded aperture generally centered in plate 50 which is sized to engage threaded filter media receiver 46. Filter element 28 includes a cavity (not shown) to receive draw tube 30. Canister 26 is similar to a spin-on type oil or fuel filter.

Fuel 14 in tank 12 includes air and vapor bubbles 15 due to the fuel 14 sloshing about and the vacuum from fuel pump 18. Fuel pump 18 draws the air and vapor bubbles 15 into the fuel intake tube 16 where they become entrained with fuel 14. The fuel 14 and air/vapor 15 mixture travels through the optional fuel filter/water separator 20 and through pump 18 to the inlet line 25 coupled to inlet fitting 40. The fuel 14 and air/vapor 15 mixture continues through the inlet port 24 into the canister 26 surrounding filter element 28. Filter element 28 dislodges the air/vapor bubbles 15 from the fuel 14 which passes through the filter element 28 and into draw tube 30. The substantially air/vapor-free fuel 14 passes up through draw tube 30 through outlet port 32 and outlet fitting 42 to outlet line 33 and on to the vehicle engine (not shown).

If the fuel needs of the engine are less than the output of pump 18, then the excess fuel 14 which passes through filter element 28 is forced through filter media receiver 46 coupled to return port 34 and fitting 44, through return line 35 and back to the tank 12. Clean, filtered fuel is returned to tank 12.

Air/vapor bubbles 15 which are dislodged from fuel 14 on the outside of filter 28 rise to the top of canister 26 and accumulate. Once an equilibrium point is reached where the pressure differential across the filter media 28 is greater than or equal to the wetted filter media resistance to air/vapor passage, the air/vapor that has accumulated at the top of canister 26 is forced through the upper portion of filter media 28 near the top plate 50. The air/vapor 15 that has passed through filter 28 immediately escapes through filter media receiver 46 and back to tank 12 through return line 35. Clean, filtered air, vapor and fuel is returned to tank 12.

It should be understood that application of the present invention is not limited to removal of air/vapor from fuel but may be adapted by one skilled in the art to remove entrained air/vapor/gas from any liquid.

It is to be understood that while certain forms of this invention have been illustrated and described, it is not limited thereto, except in so far as such limitations are included in the following claims and allowable equivalents thereof.

The invention of claimed is:

1. In combination with a fuel filter canister having a filter element disposed in the canister and sealingly separating the canister into a clean side and a dirty side, an apparatus for separating entrained air and/or vapor from the fuel comprising:
    a base having an inlet port for receiving the fuel with entrained air and/or vapor, an outlet port, a return port, and a receiver for sealingly mounting the canister to said base,
    said inlet port in communication with the dirty side of said canister,
    said return port in communication with an upper portion of the clean side of said canister,
    said outlet port in communication with the clean side of said canister,
    a draw tube coupled to said outlet port and having an opening extending to a lower portion of said clean side of said canister,
    wherein fuel with entrained air and/or vapor enters said inlet port of said base and passes through said filter element, said air and/or vapor separates from said fuel rises to said upper portion of the clean side of said canister and exits through said return port in said base, and wherein fuel without entrained air and/or vapor enters said opening in said draw tube extending to said lower portion of said clean side of said canister and exits through said draw tube to said outlet port.

2. The combination as set forth in claim 1 wherein a portion of the fuel passing through said filter element exits through said return port.

3. The combination as set forth in claim 1 wherein said fuel filter canister includes a 10 micron filter.

4. The combination as set forth in claim 1 wherein said fuel filter canister includes a 3 micron filter.

5. The combination as set forth in claim 1 further comprising a fuel pump connected to said inlet port of said base.

6. The combination as set forth in claim 5 further comprising a pressure regulator connected between said fuel pump and said inlet port.

7. The combination as set forth in claim 1 wherein said base further includes a pressure regulator between said inlet port and the dirty side of the said canister.

8. In combination with a canister having a filter element disposed in the canister and sealingly separating the canister into an inlet side and an outlet side, an apparatus for removing undesired gas from a liquid comprising:
    a base having an inlet port for receiving the liquid with undesired gas, an outlet port, a return port, and a receiver for sealingly mounting the canister to said base,
    said inlet port in communication with the inlet side of the canister,
    said outlet port in communication with the outlet side of the canister,
    said return port in communication with an upper portion the outlet side of said canister, a draw tube coupled to said outlet port and having an opening extending to a lower portion of said canister, wherein liquid with undesired gas enters said inlet port of said base and the inlet side of the canister, the undesired gas rises to the top of the canister, passes through the filter element and exits through said return port of said base, said liquid passes through said filter element, enters said opening of said draw tube and exits through said draw tube to said outlet port.

9. The combination as set forth in claim 8 wherein a portion of said liquid exits through said return port.

10. In combination with a filter canister, an apparatus for separating entrained air and/or vapor from a liquid fuel comprising:

a base having an inlet port for receiving fuel with entrained air and/or vapor, an outlet port, a return port, and a receiver for releasably mounting the filter canister to said base, said inlet port in communication with an inlet side of the filter canister, said outlet port and said return port in communication with an interior area of the filter canister, and a tube connected to said outlet port and extending to a lower portion of said interior area of the filter canister below said return port, wherein fuel entrained with air and/or vapor enters said inlet port of said base and flows to the inlet side of the filter canister, said air and/or vapor passes from the inlet side to the interior area of the filter canister and exits through said return port, fuel passes from the inlet side to the interior area of the filter canister and exits through said draw tube to said outlet port.

11. The combination as set forth in claim 10 wherein a portion of the fuel passing from the inlet side to the interior area of the filter canister exits through said return port.

12. The combination as set forth in claim 10 wherein said filter canister includes a 25 micron filter.

13. The combination as set forth in claim 10 wherein said filter canister includes a filter of less than 45 microns.

14. The combination as set forth claim 10 further comprising a fuel pump connected to said inlet port of said base.

15. The combination as set forth in claim 14 wherein said fuel pump has an output of greater than 30 gallons per hour.

16. The combination as set forth in claim 10 wherein said base further includes a pressure regulator between said inlet port and said inlet side of said filter canister.

17. In combination with a fuel filter canister having a filter element disposed in the canister and sealingly separating the canister into a first side and a second side, an apparatus for separating entrained air and/or vapor from the fuel comprising:

a base having a first port for receiving the fuel with entrained air and/or vapor, a second port, a third port, and a receiver for sealingly mounting the canister to said base, said first port in communication with the first side of said canister, said second port in communication with a lower portion of the second side of said canister, a draw tube coupled to said third port and having an opening extending to an upper portion of the second side of said canister, wherein fuel with entrained air and/or vapor enters said first port of said base, into the first side of said canister, and passes through said filter element into the second side of said canister said air and/or vapor separates from said fuel and enters said opening in said draw tube and exits through said draw tube to said third port in said base, and wherein fuel without entrained air and/or vapor exits through said second port.

18. The combination as set forth in claim 17 wherein a portion of the fuel passing through said filter element exits through said draw tube to said third port.

19. The combination as set forth in claim 17 wherein said fuel filter canister includes a 10 micron filter.

20. The combination as set forth in claim 17 wherein said fuel filter canister includes a 3 micron filter.

21. The combination as set forth in claim 17 further comprising a fuel pump connected to said first portion of said base.

22. The combination as set forth in claim 21 further comprising a pressure regulator connected between said fuel pump and said first port.

23. The combination as set forth in claim 17 wherein said base further includes a pressure regulator between said first port and the first side of the said canister.

* * * * *